Sept. 10, 1935.  I. JEPPSSON  2,013,887
MIXER
Filed Oct. 28, 1932    3 Sheets-Sheet 1

Sept. 10, 1935.  I. JEPPSSON  2,013,887

MIXER

Filed Oct. 28, 1932  3 Sheets-Sheet 2

Inventor
Ivar Jeppsson
By
Wilson, Bowell, McCanna & Wintercorn
Attys.

Sept. 10, 1935.  I. JEPPSSON  2,013,887
MIXER
Filed Oct. 28, 1932    3 Sheets-Sheet 3
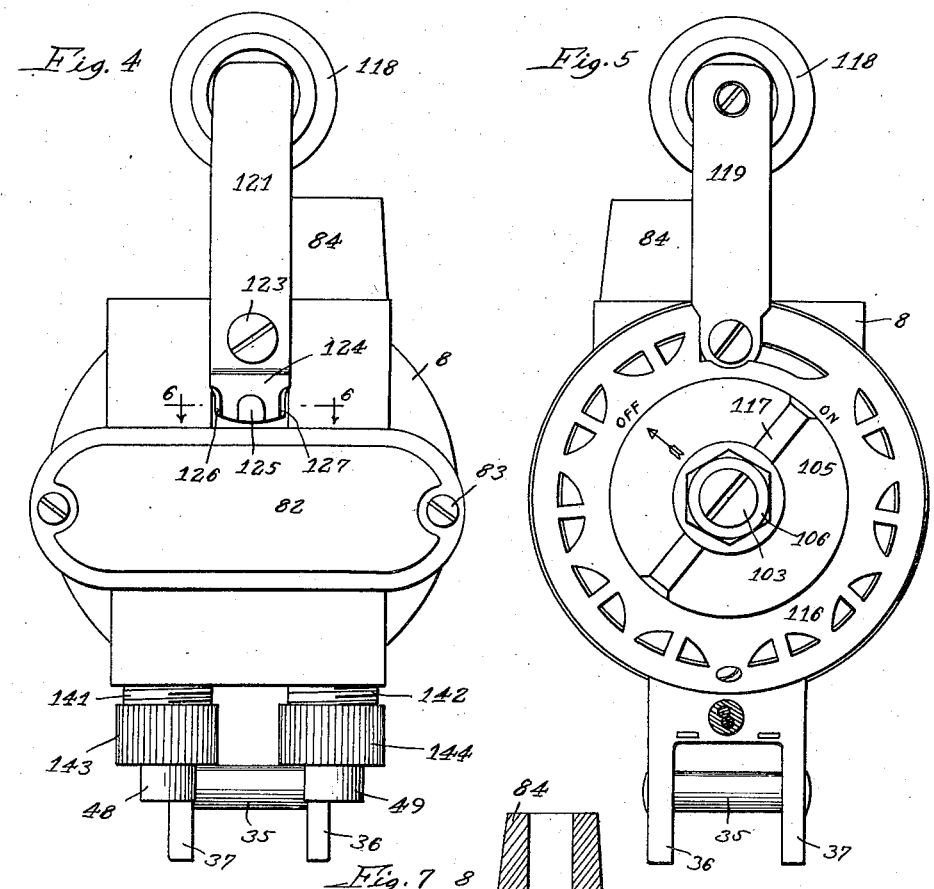
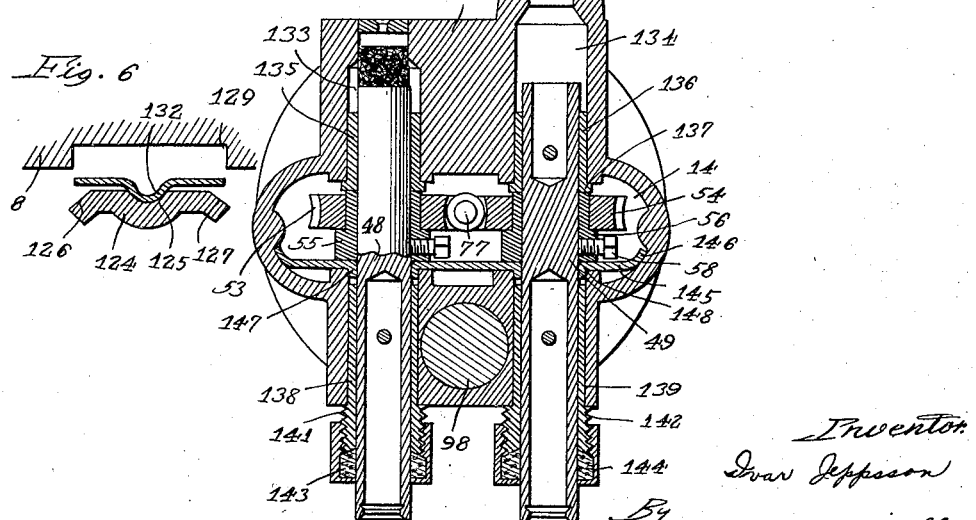

Patented Sept. 10, 1935

2,013,887

UNITED STATES PATENT OFFICE 2,013,887

MIXER

Ivar Jeppsson, Chicago, Ill., assignor to Chicago Flexible Shaft Company, Chicago, Ill., a corporation of Illinois Application October 28, 1932, Serial No. 639,953

12 Claims. (Cl. 259—84)

This invention relates to mixers of the type employed for general household mixing and beating operations such as beating eggs and batter, whipping cream, and the like, and is especially directed to certain improvements in this type of machine resulting in reducing the cost of manufacture, and improving the flexibility and utility of the device.

Among the various objects of the invention are to form the mixer in two units, a pedestal unit arranged to support the mixing bowl and a mixer unit consisting of a horizontally disposed motor and depending beaters, the motor being firmly supported on the pedestal for suitable rotation and being capable of complete removal from the pedestal for use as a portable mixing unit; to provide detachable beaters and improved means for releasably holding the same and driving them from the motor; to provide an arrangement of parts in a compact manner such as to cheapen the cost of construction and at the same time enhance the operating efficiency thereof; and to provide a handle construction such as to insure the proper use of the mechanism.

Other objects and attendant advantages will become apparent as the description proceeds and from the accompanying drawings, in which—

Fig. 4 is a front view of the mixer unit showing the handle in its operative position over the motor;

Fig. 5 is an end elevation of the rear end of the mixer unit showing the handle in its operative position, and the face of the switch;

Fig. 6 is a section on the line 6—6 of Fig. 4 showing the handle detent, and

Fig. 7 is a section through the gear box and spindle bearings of a modified form of construction.

Figure 1:
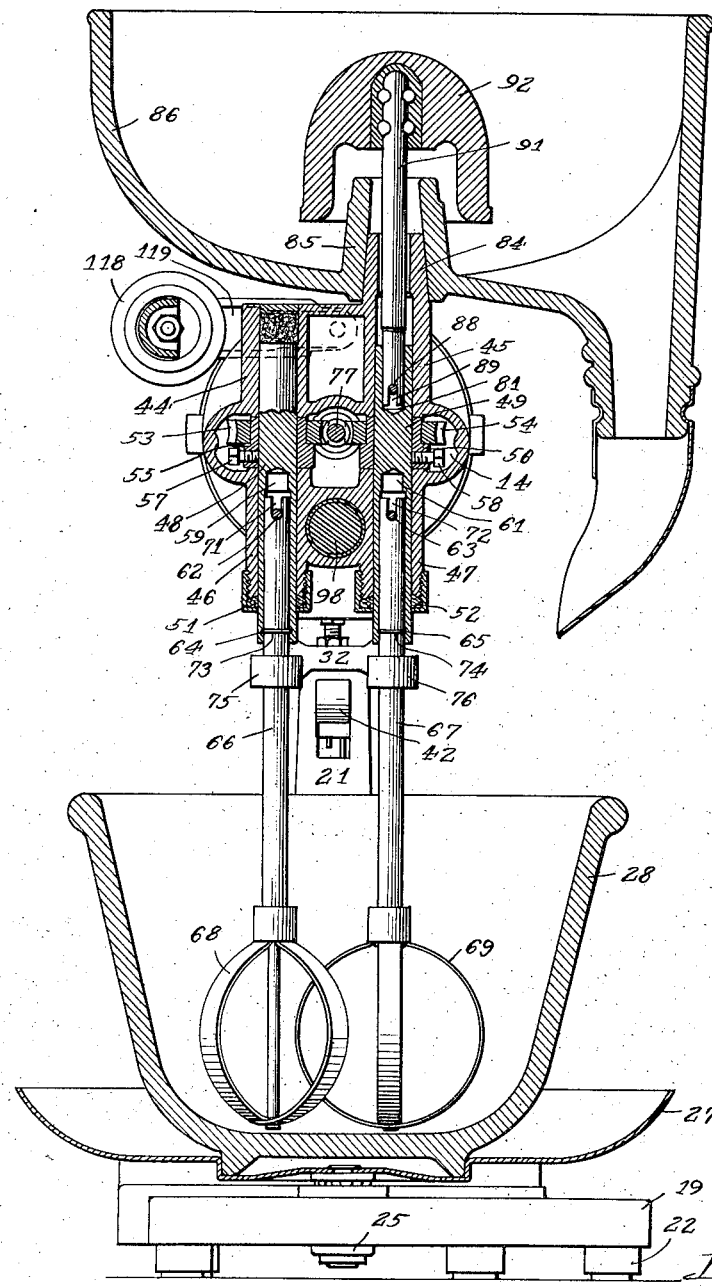
Figure 1 is a vertical section through the gear chamber, juicer bowl and beater bowl showing the handle in its operative position at the side of the motor.

The invention contemplates a mixer having a pedestal arranged to support a mixing bowl and to support a horizontally disposed motor in a position to overhang the bowl, the motor casing carrying depending beaters to mix or agitate material in the bowl. The motor is rotatable about a horizontal axis to swing the beaters into and out of the bowl. Means are provided for securing the motor to the pedestal through a pivotal connection permitting of such rotation of the motor, this means being so arranged that the pedestal and motor are normally securely held together but may be separated by the actuation of trip mechanism. Switch mechanism is mounted on the motor casing in such manner in such position as to be entirely outside of the motor casing yet enhance the symmetry and appearance of the mechanism and provide simple yet highly convenient and efficient switch mechanism. A handle is positioned on the motor to facilitate the portable use of the mixer unit, the handle being movable between a position in which the juice extracting bowl may be supported upon the motor and a position requiring the removal of this bowl before the handle may be rotated into its normal operative position.

Referring to the drawings, the numeral 8 designates the casing of a motor, indicated generally by the numeral 9, having the usual armature 11 and coils 12. The casing is provided with a partition 13 forming a gear chamber 14 and a motor chamber 15, a partition 16 forming a condenser chamber 17 and a rear wall 18 closing the rear end of the motor chamber, against which a switch is supported, as will presently more fully appear. The motor is supported upon a pedestal having a bowl supporting portion 19 and an upright 21, the pedestal having a plurality of legs 22 preferably tipped with rubber or other resilient material 23 for the purpose of supporting the mixer on a table or other support. The bowl supporting portion 19 of the pedestal is provided with one or more openings 24 for the reception of bearing members 25 arranged to support a pintle 26 for rotation. The pintle 26 is fixed in a bowl supporting tray 27 shaped and positioned to support any of a plurality of mixing bowls of different size, such as designated generally by the numeral 28, the bearing 25 being moved from one opening to another depending upon the size of the bowl.

The upright 21 of the pedestal is adapted to serve as a handle or convenient grasping point for movement of the mixer and is preferably, although not necessarily, hollow in order to maintain the weight of the pedestal at a minimum. One phase of the invention contemplates that at least the upper end of the pedestal be hollow, as shown at 29, and be open at its upper end. A further opening is provided on the forward side of the pedestal, as shown at 31, the opening stopping short of the end of the pedestal to provide an abutment 32. The upper end of the pedestal is provided with transverse slots 33 and 34, best shown in Fig. 3, these slots being in the walls of the hollow upper end and in such position as to receive a bearing pin 35 extending between the downwardly projecting ears 36 and 37 on the bottom of the motor casing 8. A pawl designated generally by the numeral 38 is rotatably positioned in the hollow upper end of the pedestal on a pin 39, the pawl having a retaining arm 41 adapted to partially encompass the pin 35, and an actuating arm 42 extending out of the pedestal through the opening 31. A coil spring 43 acts between the pedestal and the pawl to normally maintain it in a closed position in which the pin 35 is retained against lateral movement out of the slots 33 and 34, the pawl being rotatable against the tension of the spring for such removal through manual manipulation of the arm 42. Thus, the motor normally rests on the pedestal and is securely held against removal therefrom by the pawl. However, the motor may be rotated about the pivot pin 35 between a substantially vertical position and a horizontal position, such as shown in Fig. 2, the pin 35 turning in the slots 33 and 34 to accomplish this rotation.

Spaced upper spindle bearings 44 and 45 and lower spindle bearings 46 and 47 open into the gear chamber 14 and serve to support spindles 48 and 49, the spindles passing directly through the gear chamber and terminating at their upper ends within the upper bearings 44 and 45, their lower ends projecting slightly beyond the lower ends of the lower bearings 46 and 47. Stuffing boxes 51 and 52 prevent the egress of lubricant along the spindle walls. Worm gears 53 and 54 on hubs 55 and 56 are secured to the spindles by means of set screws 57 and 58, the hubs 55 and 56 being of such length as to be received between the upper and lower bearings within close limits so as to prevent longitudinal movement of the spindles. The lower ends of the spindles are provided with sockets 59 and 61 having cross-pins 62 and 63 near their upper ends and annular recesses 64 and 65 near their lower ends for the reception of beater shafts 66 and 67, the beater shafts being provided with beater elements 68 and 69 at their lower ends. The beater shafts are of such length that when the motor occupies its horizontal position they will depend into the bowl 28 for the purpose of mixing the contents thereof. The upper ends of the beater shafts are provided with slots 71 and 72 for the purpose of receiving the pins 62 and 63 when the beater shafts are inserted in the sockets 59 and 61. The beater shafts are also provided with spring rings 73 and 74 positioned in annular recesses on the shafts, so spaced from the ends of the shafts as to snap into the annular depressions 64 and 65 when the pins 62 and 63 reach the lower end of the slots 71 and 72. The recesses on the shafts are of sufficient depth to permit the rings to be compressed so as to be flush with the outer surface of the shafts upon insertion of the latter into the sockets 59 and 61. Thus, the pins 62 and 63 and slots 71 and 72 prevent relative rotation between the beater shafts and the spindles while the spring rings 73 and 74 maintain the pins within the slots, the two groups of elements establishing a fixed driving connection between the spindles and the beater shafts. Collars 75 and 76 on the beater shafts serve to facilitate the removal of the shafts from the spindles, the operator merely grasping the collars and drawing the shafts outwardly, whereupon the spring rings will be sprung inward permitting the beater shaft to slip out of the socket. The worm gears 53 and 54 are driven by a worm 77 formed on the forward end of the motor shaft 78 which extends through the partition 13 and has bearing support therein in a sleeve bearing 79. The bearing is lubricated through a tube 81 extending to the outer surface of the casing 8. The forward side of the gear chamber 14 is closed by a plate 82 secured to the case by means of screws 83.

The casing is shaped to provide an upstanding supporting boss 84, the peripheral surface of which is tapered giving it a frusto-conical shape which fits into the hub 85 of a juicer bowl 86 while the upper end of the spindle 49 is provided with a socket 87 similar to the sockets 59 and 61 and with a pin 88 arranged to be received in a slot 89 of a juicer shaft 91. The upper end of the juicer shaft 91 carries a juicer ball 92 positioned within the juicer bowl 86. Through this arrangement, the juicer shaft 91 and cone 92 may simply be lifted out of the socket 87, the driving connection between the spindle and the juicer shaft being maintained by gravity. Likewise, the juicer bowl 86 may simply be lifted from the supporting boss 84 for its removal therefrom. The juicer bowl is supported on the boss 84 without bearing on the shaft 91 and may be rotatably adjusted on said boss to locate the spout at any desired position at the front or sides of the casing.

Figure 2:
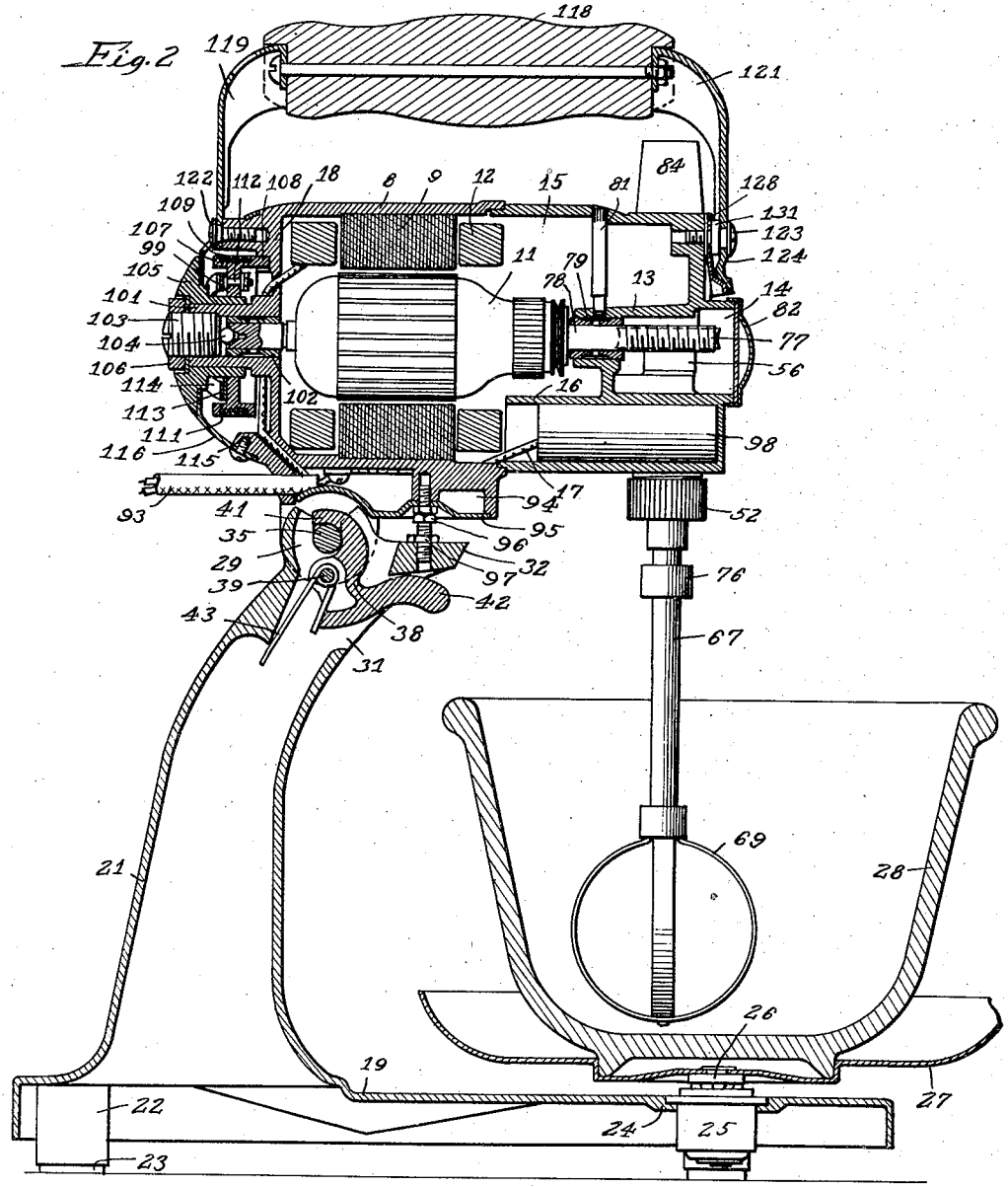
Fig. 2 is a vertical section through the mixer.
Figure 3:
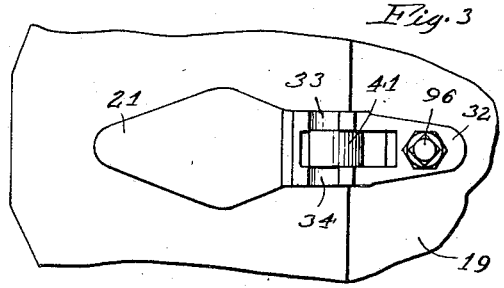
Fig. 3 is a fragmentary top view of the pedestal showing the latch mechanism.

Current is supplied to the motor 9 through leads 93 which enter the motor casing at a point above the ears 36 and 37, as shown in Figs. 2 and 5, the leads entering a small chamber 94 formed by the motor casing and a plate 95, the plate being held in position by a screw 96 which contacts an adjusting screw 97 in the abutment 32, the adjusting screw serving to locate the horizontal position of the motor so as to bring the beater blades 68 and 69 into proper adjustment with respect to the bowl 28. Interposed in the motor circuit is an electrical condenser 98 positioned in the condenser chamber 17, the condenser serving to prevent radio disturbance from the motor.

A switch designated generally by the numeral 99 is also interposed in the motor circuit for the purpose of controlling the speed of the motor. A boss 101 is formed in the partition 18 and projects rearwardly therefrom. The rear end of the motor shaft 78 is journaled in this boss on sleeve bearing 102 and a cap 103 is threaded into the rear end of the boss, a ball thrust bearing 104 being interposed between the cap 103 and the motor shaft 78 to provide an end thrust bearing for the motor shaft. A rotatable switch element 105 is positioned on the boss 101 and is held thereon by means of a nut 106 threaded onto the cap 103, the switch element being rotatable on the boss. A collar 107 is slidably positioned on the switch element 105 and is provided with lugs 108 fitting into slots in the partition 18 for the purpose of preventing rotation of the collar. The collar 107 is provided with a resistance winding 109 around its periphery, the winding being covered by insulating material 111 and having a series of taps connected to contact points 112 on the surface of the collar. The collar is also provided with a flat contact strip 113 on the same circle as the contact points 112, this arc being connected to one of the leads 93 for completing the circuit through the motor. A circular spring contact element 114 is interposed between the rotatable switch element 105 and the collar 107 and has a portion thereof constantly in contact with the contact strip 113 and a portion movable between the various contact pins 112 upon rotation of the switch element, so that upon rotation of this element contact will be made between the contact plate 113 and any of the contact points 112, thereby causing the current to pass through various amounts of resistance before reaching the motor to control the speed of the motor. The casing is provided with a peripheral upstanding edge 115 against which is secured a cover plate 116 extending between the casing and the rotatable switch member 105, the cover plate and switch member having an outer curvature which gives to the back of the motor a spherical shape. Ribs 117 on the rotatable switch element serve as finger grasps for the rotation of the switch element between its various positions.

A handle consisting of a handle proper designated by the numeral 118 and handle straps 119 and 121 is secured to the motor casing and operates together with the latch mechanism on the pedestal and motor to render the motor and beater blades capable of utilization as an independent unit, that is, a portable unit usable independently of the pedestal. The strap 119 is pivotally secured to the rear of the motor by means of a screw 122 passing through the strap and into the casing. In like manner, the strap 121 is pivotally supported on a screw 123 supported in the motor. The handle thus completely spans the motor longitudinally and thus balances the mixer unit in the hand of the operator. The handle is movable between a position directly above the motor which it occupies when the mixer is being used as a portable unit to a position such as shown in Figure 1 wherein the handle 118 lies along the side of the motor. In order to retain the handle in its vertical operative position, retainer mechanism is provided. This consists of a downwardly projecting end portion 124 on the handle strap 121, the end having a central groove 125, as best shown in Figure 6, and inwardly sloping edge portions 126 and 127. A spring detent 128 is located in a groove 129 on the forward side of the casing and is secured therein by means of a shoulder 131 on the screw 123. The lower end of the detent member is curved outward to bear against the end of the handle strap with a spring tension and is provided with an outwardly bowed portion 132 shaped for reception into the groove 125. Thus, when the handle occupies its vertical operative position the outwardly bowed section 132 of the detent rests in the groove 125 of the strap with a spring tension, resisting relative movement between the motor casing and the handle. However, excessive sidewise pressure on the handle will cause the detent to be sprung backward so that the bowed portion 132 will ride along the surface of the strap and down the sloping portion 126 or 127, whereby the handle is moved to its inoperative position at the side of the motor. Attention is directed to the fact that the handle cannot be moved to its vertical operative position when the juicer bowl 86 is in position on the motor. Consequently, before the mixing unit may be removed from the pedestal in the ordinary course of operation, it becomes necessary for the operator to first remove the juicer bowl. In this manner, the possibility of breaking the juicer bowl during the portable use of the mixer unit is obviated. Otherwise, the operator might remove the mixer unit from the pedestal with the juicer bowl still in position on the motor and have the juicer bowl drop off during the portable use of the unit since the bowl is held on the supporting boss 84 only by gravity and the frictional engagement with the tapered outer wall of said boss.

Referring now to Fig. 7, I have shown a modified form of spindle bearing construction of a type such as to improve the operating efficiency of the machine yet reduce the cost of manufacture thereof. In this construction, the motor casing is provided with sockets 133 and 134 above the gear chamber 14 for the reception of replaceable bushings 135 and 136, the bushings being provided with shoulders, such as shown at 137, at their low end arranged to bear against the upper wall of the gear chamber. These bushings are accurately drilled to receive the spindles 48 and 49. Similar sockets are provided below the gear box 14 for the reception of replaceable bushings 138 and 139, these bushings stopping short of the upper end of the sockets and projecting from the lower end thereof, the projecting portions of the bushings being threaded as shown at 141 and 142 for the reception of stuffing boxes 143 and 144. A plate 145 is positioned within the gear chamber 14 at the bottom thereof, and is provided with upturned ends, such as shown at 146, and sleeve-like spindle receiving portions 147 and 148 which project into the space between the spindles and the walls of the sockets. The worm gear hubs 155 and 156 bear directly against this plate, which serves as a bearing plate to take the wear of said gear and support the beater shafts. This construction is such that the bearing sockets may be cast directly in the motor casing, and bearing support for the spindles may be provided by pressing into the sockets, bushings which have been accurately bored and finished for the reception of the spindles, thus doing away entirely with the necessity for accurately boring the spindle bearings in the casing.

It will be seen from the foregoing description that I have provided a household mixer such that in the normal operation of the machine, the motor is rotatably positioned upon the pedestal so that the beater elements may be swung into and out of the bowl about a horizontal axis of rotation, the construction being such that the relative positions of the bowl and beater blades is accurately positioned and may be adjusted to bring about a spontaneous rotation of the bowl. At the same time, the construction is such that by depressing the arm 42 of the latch 38 the mixer unit consisting of the motor, beater shafts and blades and the switch mechanism may be lifted off the pedestal and used as a portable mixing unit. The handle is so arranged that it becomes impractical to remove the mixer unit from the pedestal while the juicer bowl is attached to the mixer unit and, as a result, it becomes necessary for the operator to remove this bowl before entering upon portable use of the mixer unit, whereby the chance of damaging the bowl is obviated.

Furthermore, the arm 42 is so shaped and positioned that the latch cannot be accidentally released when handling the mixer by the pedestal.

Another advantage of my improved construction lies in the structural features of the spindles and spindle mountings. The spindles are provided with sockets and are so arranged that the entire mechanism required for detachably connecting the beater shafts lies within the sockets. Thus, there are no protrusions or other parts on the exterior of the exposed portions of the spindles which would be apt to catch in clothing or cloth or that would damage the operator's hands, should they accidentally come into contact with these parts when the mechanism is being used with the beater shafts detached. Furthermore, the spindle mounting is such as to materially reduce the first cost of manufacture and, at the same time, permit the convenient repair of the mechanism should the spindle bearings become worn through lack of lubrication or other cause.

A still further advantage in my construction lies in the arrangement of the parts of the beater unit which permits of a compact arrangement without, at the same time, allowing for any interference between the various parts of the mechanism. The switch is located entirely outside of the motor chamber so that the heat generated in the rheostat in no way affects the operation of the motor. Furthermore, when the switch is located inside the motor chamber, it becomes necessary to move a considerable amount of air through the chamber in order to properly cool the rheostat. For this purpose it is ordinarily necessary to provide a considerable number of holes in the motor casing for this movement of air. As the air moves into and out of these openings a considerable amount of noise is generated and since the openings are necessary it becomes impossible to insulate the motor so that the motor noises are not also transmitted through these openings. Consequently, by placing the switch entirely outside of the motor chamber a construction is obtained which operates much more quietly than would otherwise be possible. Furthermore, the switch construction is such as to utilize the bearing for the motor shaft as a part of the switch support and permits the utilization of space which would otherwise be lost. The positioning of the switch at the rear end of the motor casing permits a portion of the switch elements to be used to round out and produce the proper decorative effect on the rear of the motor.

The latch construction is such that the pin on the motor may be readily removed when desired but at the same time such as to hold the pin firmly for rotation. The latch construction is such that it becomes next to impossible to accidentally trip the latch, but provides a convenient and rapid method for releasing the same when desired.

While I have thus described and illustrated a specific embodiment of my invention I am aware that numerous changes and alterations may be made therein, without departing from the spirit of the invention, and I do not desire to be limited except as required by the prior art and the scope of the appended claims, in which—

I claim:

1. A mixer comprising a pedestal arranged to support a mixing bowl, a mixer unit mounted on the pedestal to overhang the bowl and having a depending beater blade movable into and out of the bowl upon rotation of the mixer unit and a removable juicer bowl on the top of the motor, quick detachable means between the pedestal and the mixer unit, for detachably securing the unit to the pedestal for rotation thereon and a handle pivotally supported on the mixer unit to occupy a position at the side of the mixer unit to provide space for said juicer bowl and movable to a position directly above the mixer unit upon removal of the juicer bowl to position the handle for portable use of the mixer unit.

2. In a mixer, the combination of a beater shaft having a grooved end and a spring ring surrounding the beater shaft at a point spaced from but adjacent to said end, a gear casing, a spindle positioned in the gear casing for rotation and having an end projecting therefrom provided with a longitudinal socket for the reception of the grooved end of said beater shaft, an internal annular recess for the reception of said spring ring, and a lateral pin shaped and positioned for reception into the groove of said beater shaft when the latter is inserted into said socket a distance sufficient for the reception of the spring ring in said annular recess, and means within the gear casing for driving said spindle.

3. In a mixer, the combination of a casing having a gear chamber and bearing openings on the upper and lower sides of the chamber, a vertically disposed spindle extending across the gear chamber and having bearing support in said openings for rotation, said spindle being provided with longitudinal sockets at each end thereof having cross-pins near their inner ends, the lower socket having a circumferential recess spaced from the cross-pin, a juicer bowl driving shaft positioned in the upper socket and having a grooved end for the reception of said cross-pin to establish driving connection, and a beater shaft receivable in the lower socket having a grooved end for the reception of said cross-pin to establish driving connection, and a spring ring shaped and positioned for reception in said recess for maintaining said beater shaft and said cross-pin in driving relation.

4. A household mixer having, in combination, a beater supporting casing, said casing having a gear chamber and a vertical bearing opening below said gear chamber, said gear chamber adapted to serve as a lubricant reservoir for said bearing, a spindle in said bearing opening having a socket in an end thereof for the attachment of food working elements, a drive gear on said spindle within said gear chamber, a replaceable bushing secured in said bearing opening and providing bearing support for said spindle, said bushing extending beneath said casing, and a stuffing box on the extended end of said bushing for preventing escape of lubricant from the lower spindle bearing, the spindle extending slightly beyond the stuffing box for the reception of said food working elements in said socket.

5. A household mixer having, in combination, a head, a motor in said head, spindles driven by said motor, said spindles having sockets in their lower ends and one of the spindles having a socket in its upper end, means in each socket for driving a food working attachment, food working attachments having ends releasably held in said sockets in driving connection with the driving means therein, said attachments adapted to be positioned above and below said head, a stand supporting said head, and a base on which said stand is mounted.

6. A household mixer and juice extractor having, in combination, a pair of vertical spindles, a casing rotatable upon its support and providing a gear chamber and bearing openings in which said vertical spindles are journaled, drive gears on said spindles within said gear chamber, means for attaching a beater shaft to the lower end of each spindle, said casing having an upstanding supporting boss provided with a central opening intersecting the upper bearing opening of one of said spindles, a juice extractor bowl having a hollow central hub shaped internally to receive said upstanding boss and to seat thereon and serving as the sole means for retaining the bowl in position on the casing during the use of said bowl and upon rotation of the casing, a juicer cone in said bowl having a shaft passing down through the opening in said boss, and means providing a detachable driving connection between the lower end of said cone shaft and the upper end of the adjacent spindle.

7. A household mixer and juice extractor having, in combination, a base, a mixer unit supported in a stationary position on the base and removable therefrom for independent use, a juicer bowl removably supported on top of the mixer unit, and a handle mounted on the mixer unit, normally occupying a position at one side of the juicer bowl, said handle being movable to a position above the mixer unit when the juicer bowl is removed and serving in said latter position for portable use of the mixer unit.

8. A household mixer and juice extractor having, in combination, a mixer unit, means supporting the mixer unit in a working position and permitting removal of said unit for use remote from and independent of said working position, a juicer bowl removably mounted on said mixer unit, and a handle mounted on the mixer unit, normally occupying a position at one side of said juicer bowl, and means whereby upon removal of the juicer bowl said handle may be moved into an operative position normally occupied by said juicer bowl.

9. A household mixer and juice extractor having, in combination, a beater support, an upstanding boss on the beater bowl, a juicer support shaped to fit on said upstanding boss and supported thereby, a juicer cone having a drive shaft extending down through said boss, a beater mounted on said support, means on the support for driving said beater and said cone drive shaft, and a handle mounted on said support in a position at one side of the juicer bowl and movable to a position above said upstanding boss when the juicer bowl is removed therefrom.

10. A household mixer and juice extractor having, in combination, a base, a mixer unit supported in a stationary position on the base and removable therefrom for independent use, a juicer bowl removably supported on top of the mixer unit, a handle mounted on the mixer unit, normally occupying a position at one side of the juicer bowl, said handle being movable to a position above the mixer unit when the juicer bowl is removed and serving in said latter position for portable use of the mixer unit, and means to secure the handle in the latter position for rigid connection between the handle and the mixer unit during the portable use thereof.

11. The combination in a household mixer of a mixer unit comprising a casing having a motor chamber and a gear chamber, a motor in the motor chamber having a forwardly extending shaft projecting into the gear chamber, laterally spaced vertical spindles carrying beaters positioned on opposite sides of said shaft and extending through said gear chamber, vertically disposed bearings for said spindles positioned on the bottom wall of said gear chamber and extending downward therefrom, said casing having an internal shape providing a condenser chamber substantially defined at its top by said gear chamber, at its sides by said bearings and at its front by the front plane of said bearings, the condenser chamber extending longitudinally of said shaft, whereby to utilize a normally unusable space within the casing for a condenser, and a condenser located in said condenser chamber connected to the wiring system of said motor.

12. The combination in a portable household mixer of a pedestal arranged to support a mixing bowl, a mixer unit mounted on the pedestal to one side of the bowl to overhang the same and having a depending beater blade movable into and out of the bowl upon rotation of the mixer unit, a single pivot pin located below and near the rear of the mixer unit for reception in a socket on the pedestal for rotatably supporting the unit thereon, and manually operable spring pressed latch means engaging the upper side of said pin for positively retaining a pin in the socket, operable against the spring pressure to release the mixer unit from the pedestal for portable use thereof.

IVAR JEPPSSON.

CERTIFICATE OF CORRECTION.

Patent No. 2,013,887. September 10, 1935.

IVAR JEPPSSON.

It is hereby certified that error appears in the printed specification of the above numbered patent requiring correction as follows: Page 5, first column, line 26, claim 9; for "bowl" read support; and same claim, lines 26-27, for "support" read bowl; and that the said Letters Patent should be read with these corrections therein that the same may conform to the record of the case in the Patent Office.

Signed and sealed this 5th day of November, A. D. 1935.

(Seal)

Leslie Frazer
Acting Commissioner of Patents.